United States Patent [19]

Hagenbuch

[11] Patent Number: 5,228,750
[45] Date of Patent: Jul. 20, 1993

[54] ROTATING HEAD FRAME AND LOAD EJECTOR WITH CONTROLLED ROTATION SYSTEM

[76] Inventor: LeRoy G. Hagenbuch, 4602 N. Rosemead Dr., Peoria, Ill. 61614

[21] Appl. No.: 804,071

[22] Filed: Dec. 6, 1991

[51] Int. Cl.$^5$ .............................................. B60P 1/48
[52] U.S. Cl. ................................... 298/1 B; 105/423; 296/98; 414/393
[58] Field of Search .............. 298/1·R, 1 B; 414/393, 414/425, 489, 493; 296/98, 100; 105/423

[56] References Cited

U.S. PATENT DOCUMENTS

| | | | |
|---|---|---|---|
| 1,485,631 | 3/1924 | Shea | 298/1 B |
| 1,808,251 | 6/1931 | Osman | 298/1 B |
| 2,976,082 | 3/1961 | Dahlman | 296/98 |
| 3,628,826 | 12/1971 | Sibley | 296/98 |
| 4,050,734 | 4/1977 | Richard | 296/98 |
| 4,341,416 | 7/1982 | Richard | 296/98 |

FOREIGN PATENT DOCUMENTS

| | | | |
|---|---|---|---|
| 251254A | 11/1987 | German Democratic Rep. | 298/1 B |
| 456158 | 5/1935 | United Kingdom | 298/1 B |
| 580033 | 8/1946 | United Kingdom | 298/1 B |

OTHER PUBLICATIONS

Brochure of Philippi-Hagenbuch, Inc. *Gateway to Production—Load Ejector for Off-Highway Trucks* 1990.
Reduced copy of a blueprint of Philippi-Hagenbuch's Load Ejector, 1988.

Primary Examiner—Michael S. Huppert
Assistant Examiner—Gregory A. Morse
Attorney, Agent, or Firm—Leydig, Voit & Mayer

[57] ABSTRACT

A rotating head frame and load ejector assembly having a pair of opposing and parallel rotating side arms which can rotate between a loading and dumping position is disclosed. The bottom ends of the side arms are pivotally attached to the side walls of the dump body so that the arms can rotate about a side pivot pin to form an arcuate path between the loading and dumping position. A transverse bar attached to the top end of the arms carries a load ejector so that when the arms are rotated to the dumping position, the load ejector dislodges the load from the bottom of the dump body. In order to prevent the head frame from damaging the dump body during its rotation along the arcuate path, means for controlling the rate of rotation of the head frame is provided. A hydraulic cylinder is pivotally attached to each rotating arm and the side wall of the dump body. As the piston rod of the hydraulic cylinder slides within the piston chamber in response to the rotation of the side arms, internal chambers are formed. The internal chambers are in communication with a pressure assembly which ensures that the internal chambers are filled with hydraulic fluid. The presence of the hydraulic fluid in both internal chambers controls the rate of movement of the piston rod in both directions. Thus, the rate of movement of the piston rod and, concomitantly, the rate of rotation of the rotating arms is always controlled as the rotating arms rotate between the loading and dumping position.

9 Claims, 5 Drawing Sheets

ROTATING HEAD FRAME AND LOAD EJECTOR WITH CONTROLLED ROTATION SYSTEM

FIELD OF THE INVENTION

The present invention relates generally to an assembly for ejecting a load from a dump truck body and more particularly to a rotating head frame and load ejector assembly.

BACKGROUND OF THE INVENTION

Dump trucks have a dump body adapted to receive and carry a load to a designated dump site where the load is dumped by tilting the dump body. In many instances, however, part or all of the load is trapped in the dump body because of the incompatibility of the physical characteristics of the load and the design of the dump body. In order to dislodge the load, the load has to be dug or scraped out of the interior of the dump body.

Load ejectors have also been utilized to dislodge the load. Typically, load ejectors are attached to the top of the front slope plate of the dump body and lie loosely on the bottom of the dump body so that when the dump body is raised, the load ejectors hang from the head of the dump body causing the load to be dislodged from the bottom of the dump body and ejected. These load ejectors will typically hang substantially vertically to the ground so that the bottom portion of the ejector extends substantially to the end of the dump body. This type of load ejector, however, is ineffective in long or shallow dump bodies because, when the dump body is tilted, the bottom portion of the load ejector sags along the bottom of the dump body, unable to dislodge the load.

In order to dislodge the load in long or shallow dump bodies, the ejectors can be attached to a rotating head frame, pivotally mounted at a pivot point on the dump body, the rotating head frame then moves the end of the ejector to the rear of the dump body in order to prevent the bottom portion of the ejector from sagging along the bottom of the dump body. Although the rotating head frame can be actively rotated using a hydraulic system consisting of a hydraulic cylinder, pump and valves, the system would be expensive and could be difficult to maintain in the construction environment so that passive means have been utilized to rotate the head frame between the body loading and dumping positions.

In the typical passive rotating head frame system, gravity is used to rotate the head frame along an arcuate path between the body loading and dumping positions. Specifically, the center of gravity of the head assembly, consisting of the head frame and the load ejector is located so that it is forward of the head frame pivot point when the dump body is in the loading position and is to the rear of the head frame pivot point when the dump body is in the dumping position. When the dump body is raised, gravity forces the head frame to rotate to the rear of the head frame pivot point thereby moving the load ejector to the rear of the dump body to dislodge the load. Similarly, when the dump body is lowered, gravity forces the head frame to pivot forward of the head frame pivot point thereby returning the load ejector ready to accept another load.

Without a hydraulic system, however, there is no means to control the rotation of the head frame which, when it falls, accelerates and gathers momentum before it impacts on the dump body. It will be appreciated that head frames and load ejectors are large, sturdy and relatively heavy so that tremendous forces and stresses can be created when the dump body is impacted. This can obviously create a dangerous situation to the equipment, which can be damaged by a rotary head frame. Attempts to control the rate of rotation of the head frame as it falls have been largely unsatisfactory.

OBJECTS AND SUMMARY OF THE INVENTION

Accordingly, it is an object of the present invention to provide a rotating head frame system in which the rate of rotation is regulated throughout the entire arcuate path of the head frame as it moves between the loading and dumping positions.

It is another object of the present invention to provide a rotating head frame and load ejector assembly which dislodges a load from a dump body.

A more specific object of the present invention is to provide a rotating head frame which can accommodate dump bodies having different widths.

Accordingly, the present invention provides a rotating head frame and load ejector assembly which controls the rate of rotation of the head frame as it rotates along the arcuate path formed between the loading position and the dumping position. The head frame has a pair of opposing and parallel rotating side arms.

The side arms have plate members rigidly attached to the top ends to receive a transverse bar between them. The plate members have a plurality of holes along the outside edge of the plate members to receive bolts between them so that when the transverse bar is placed between them and the bolts are attached to the holes, the transverse bar is securely attached to the top ends of the side arms. It will be appreciated that the transverse bar may be any length in order to accommodate dump bodies having different widths.

The bottom ends of the head frame side arms are pivotally attached to the side walls of the dump body at a side pivot point. The head frame side pivot point is located so that the center of gravity of the head assembly, consisting of the head frame and the load ejector, is forward of the vertical plane of the pivot point in the loading position and to the rear of the vertical plane of the pivot point in the dumping position. Thus, when the dump body is in the loading position, gravity will force the head frame to rotate forward of the vertical plane of the pivot point and, when the dump body is in the dumping position, gravity will force the head frame to rotate to the rear of the vertical plane of the pivot point.

The load ejector has the top end pivotally attached to the transverse bar of the head frame and a bottom portion which lies on the floor of the dump body in the loading position. When the head frame rotates to the dumping position, the head frame moves the load ejector to the rear of the dump body thereby dislodging the load from the bottom of the dump body.

In order to prevent the head frame from damaging the dump body as it rotates between the loading and dumping positions, means for controlling the rate of rotation of the head frame throughout its arcuate path is provided. The rotation controlling means includes a hydraulic cylinder associated with each rotating arm. The hydraulic cylinder has a piston rod slidably disposed in a piston chamber. The piston chamber is pivotally coupled to the side wall of the dump body and the piston rod is pivotally coupled to the side arm so that the piston rod slides within the piston chamber in response to the rotation of the head frame side arms along their arcuate path. As the piston rod slides within the piston chamber, it forms two internal chambers which are in constant communication with a pressurized hydraulic reservoir which feeds hydraulic fluid into the internal chambers. The presence of the hydraulic fluid controls and slows the movement of the piston rod and, concomitantly, the side arms. Thus, it will be appreciated that the hydraulic cylinder controls the rate of rotation of the side arms and prevents damage to the dump body as the head frame rotates along its arcuate path between the loading and dumping position.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
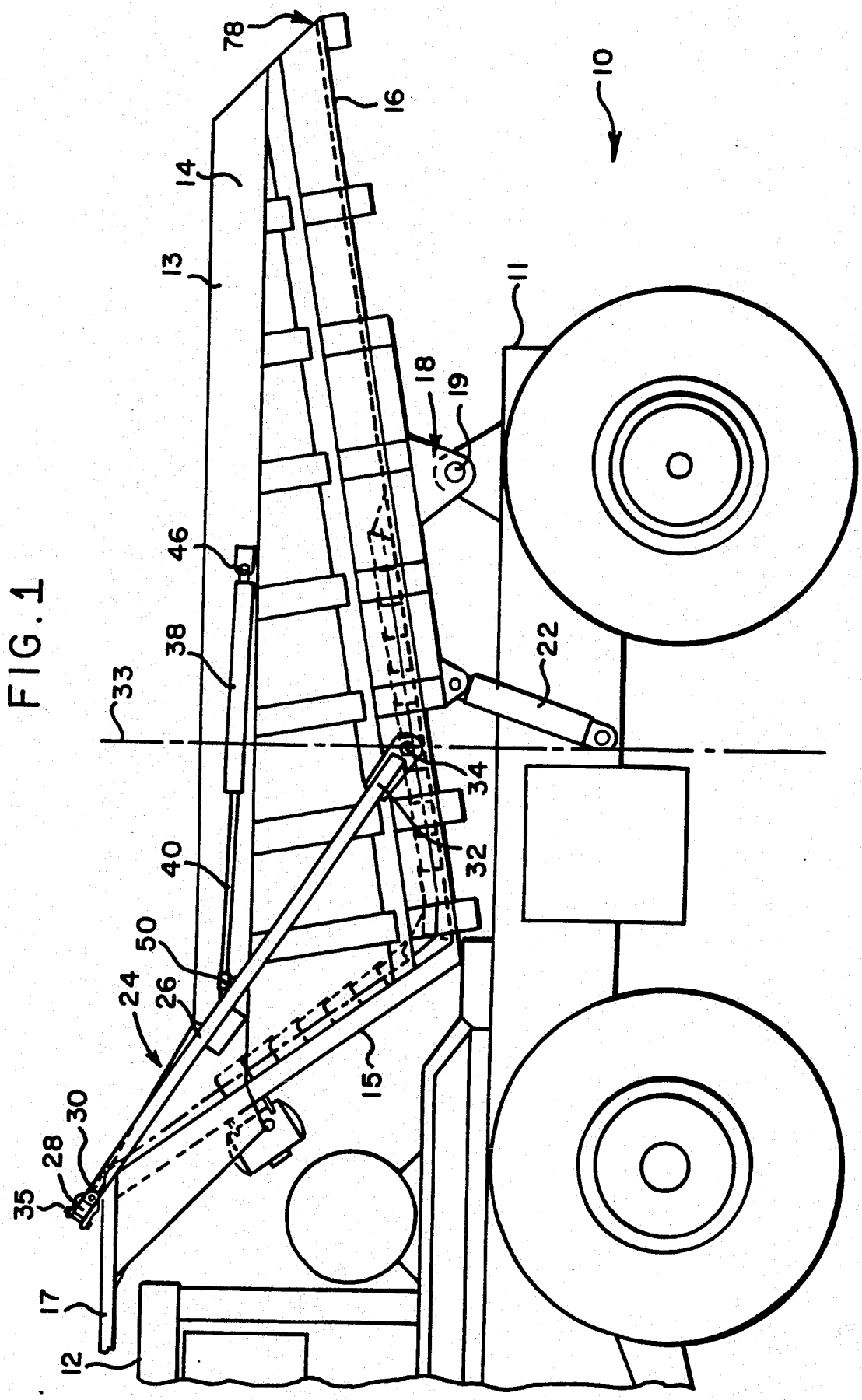
FIG. 1 is a side elevational view of a rotating head frame and load ejector assembly in the loading position and according to the present invention.

Referring to FIG. 1, there is shown a side elevational view of a typical rear dump truck 10. The rear dump truck 10 includes main frame 11 carrying a cab 12 and a dump body 13. The dump body has a pair of side walls 14 (only one side is shown), a head wall 15 and a bottom floor 16 which form an open top so that earth or other loads can be collected in the dump body 13. Furthermore, most rear dump trucks have a canopy 17 attached to the head wall 15 in order to protect the cab 12 when the dump body 13 is being loaded.

The dump body 13 is generally connected to the main frame 11 by a body pivot assembly 18. Consequently, the dump body 13 can rotate about a body pivot pin 19 to provide a loading position for accepting a load (shown in FIG. 1) and a dump position for dumping a load (shown in FIG. 2). A lifting means is provided which lowers and raises the dumping body between the body loading and dumping positions. In the illustrated embodiment, the lifting means is a pair of hydraulic cylinders 22 (only one cylinder is shown) located between the dump body and the truck frame.

In accordance with one objective of the present invention, there is provided a rotating head frame and load ejector assembly. The head frame 24 has a pair of opposing and parallel rotating side arms 26. The bottom ends 32 of the side arms 26 are pivotally connected to the side walls 14 by a side pivot pin 34 so that the side arms 26 can rotate between the loading and dumping positions.

A transverse bar 28 is attached at the top ends 30 of the side arms 26. It will be appreciated that the head frame 24 may have to be attached to dump bodies having different widths. Therefore, the preferred embodiment shown in FIG. 4 accommodates dump bodies of different widths by having two opposing and parallel plate members 29, which are rigidly attached to the top ends 30 of the side arms 26 and which are adapted to receive a transverse bar 28 of different lengths between them. The plate members 29 have a plurality of holes 31 along their outermost edge to receive bolts 35 so that when the transverse bar 28 is placed between the plate members 29 and the bolts 35 are attached to the holes 31, a transverse bar 28 of any length will be securely attached to the side arms 26. In the loading position, the dump body 13 carries the transverse bar 28 generally near the top of the head wall 15.

It will be appreciated that the head frame 24 forms an arcuate path as it rotates between the body loading and dumping positions. Similarly, the head frame 24 can only rotate in two directions—from the loading position to the dumping position and from the dumping position to the loading position.

Means for rotating the head frame 24 when the dump body 13 is raised between the loading and dumping position is also provided. An active hydraulic cylinder can also be used to rotate the head frame 24. In the preferred embodiment, the rotating means is passive in that gravity, not an active system such as a hydraulic system, acts to force the head frame 24 to rotate. In order to passively rotate the head frame 24, the vertical plane 33 passing through the axis of the side pivot pin 34 should be located on the side wall 14 so that gravity can cause the head frame 24 to rotate. Specifically, side pivot pin 34 should be located so that the center of gravity of the head assembly, consisting of the head frame 24 and the load ejector 70, is forward of the vertical plane 33 when the dump body 13 is in the loading position and to the rear of vertical plane 33 when the dump body 13 is in the dumping position. Thus, it will be appreciated that gravity will act to force the head frame 24 and the load ejector 70 to rotate forward when the dump body 13 is in the loading position, as shown in FIG. 1. Similarly, gravity will act to force the head frame 24 and the load ejector 70 to rotate to the rear when the dump body 13 is in the dumping position, as shown in FIG. 2.

Figure 2:
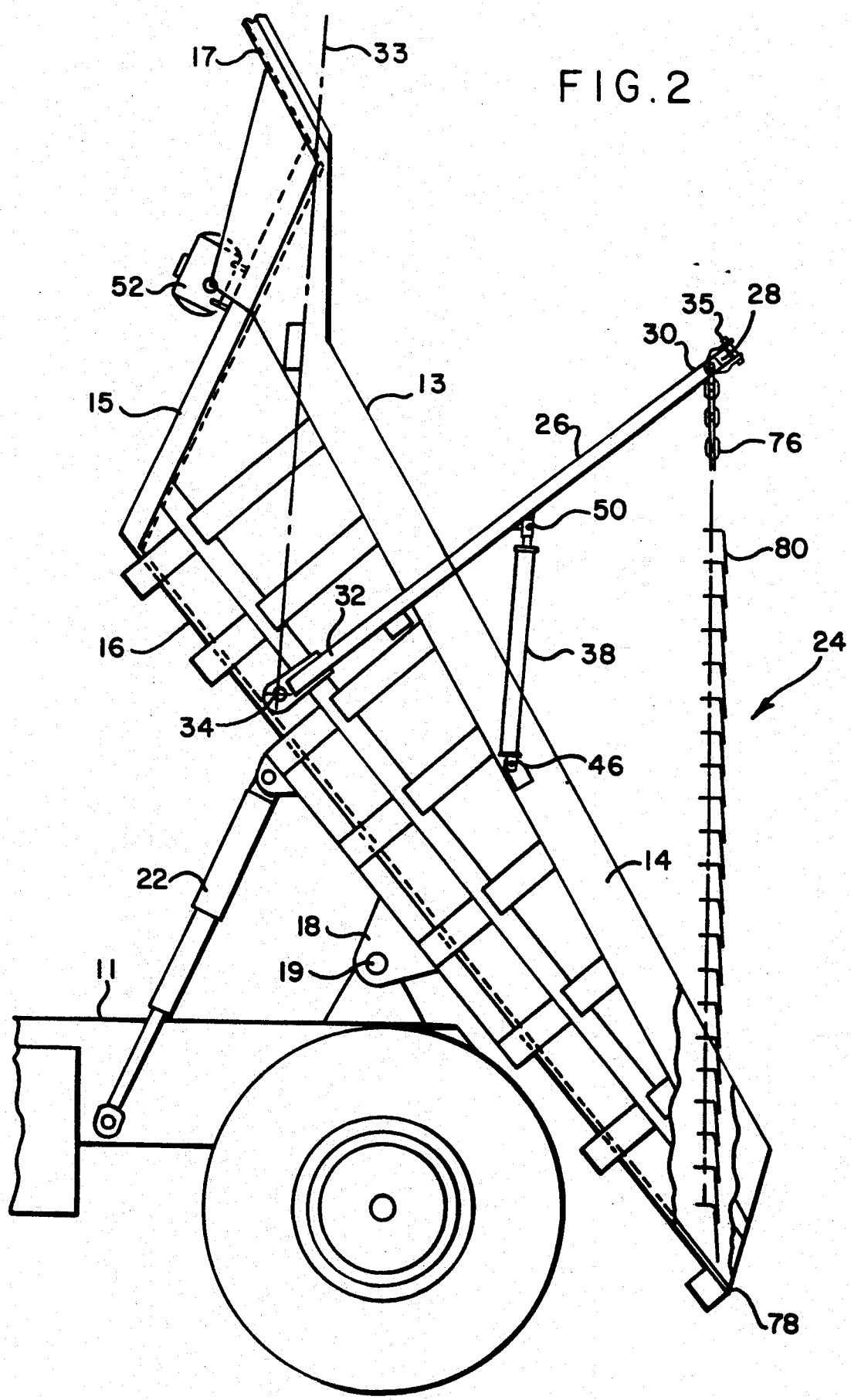
FIG. 2 is a side elevational view of the rotating head frame and load ejector assembly in the dumping position.

Upon reference to FIGS. 1 and 2, it will be appreciated that as the dump body 13 rotates from the loading position to the dumping position, it rotates the head frame 24 about the vertical plane 33 passing through side pivot pin 34. In the loading position, the center of gravity of the head frame 24 and the load ejector 70 is forward of the vertical plane 33 passing through the side pivot pin 34 but, at some point during the rotation of the dump body 13, the center of gravity of the head frame 24 and the load ejector 70 will pass through the vertical plane 33. At that point, gravity will force the head frame 24 to rotate to the rear of the vertical plane 33 as shown in FIG. 2. Similarly, when the dump body 13 is lowered from the dumping position to the loading position at some point, the center of gravity of the head frame 24 and load ejector 70 will pass through the vertical plane 33, forcing the head frame 24 to rotate forward from the vertical plane 33.

As the relatively large and heavy head frame 24 rotates along its arcuate path, gravity forces it to accelerate and gather momentum. When it impacts on the dump body 13, tremendous forces and torques are generated which can damage the dump body 13 and head frame 24. In order to prevent such damage and in accordance with one of the objects of the present invention, means for controlling the rate of rotation of the head frame 24 throughout its entire arcuate path is provided. Unlike previous rotating head assemblies, the rotation controlling means controls and regulates the rate of rotation in both directions of movement and maintains the rate of rotation relatively constant. By regulating the rate of rotation throughout the entire arcuate path, the rotation controlling means prevents gravity from accelerating the head frame 24 too rapidly and creating the excessive forces and stresses which would otherwise damage the dump body 13 and head frame 24.

In the preferred embodiment, the head frame 24 rotation controlling means includes a passive hydraulic cylinder 38 associated with each side arm 26. The hydraulic cylinder 38 has a piston rod 40 slidably disposed in a piston chamber 42. In order to accommodate movement between the cylinder and the side walls 14 and side arms 26, the piston chamber 44 is pivotally attached to the side wall 14 at pivot pin 46 and the piston rod 42 is pivotally attached to the rotating side arm 26 of the head frame 24 at pivot pin 50. Also, the piston rod can slide between an extended position in the loading position (shown in FIG. 1) and a contracted position in the dumping position (shown in FIG. 2). It will be appreciated that the piston rod 40 will slide within the piston chamber 42 in response to the rotation of the head frame 24.

Figure 5B:
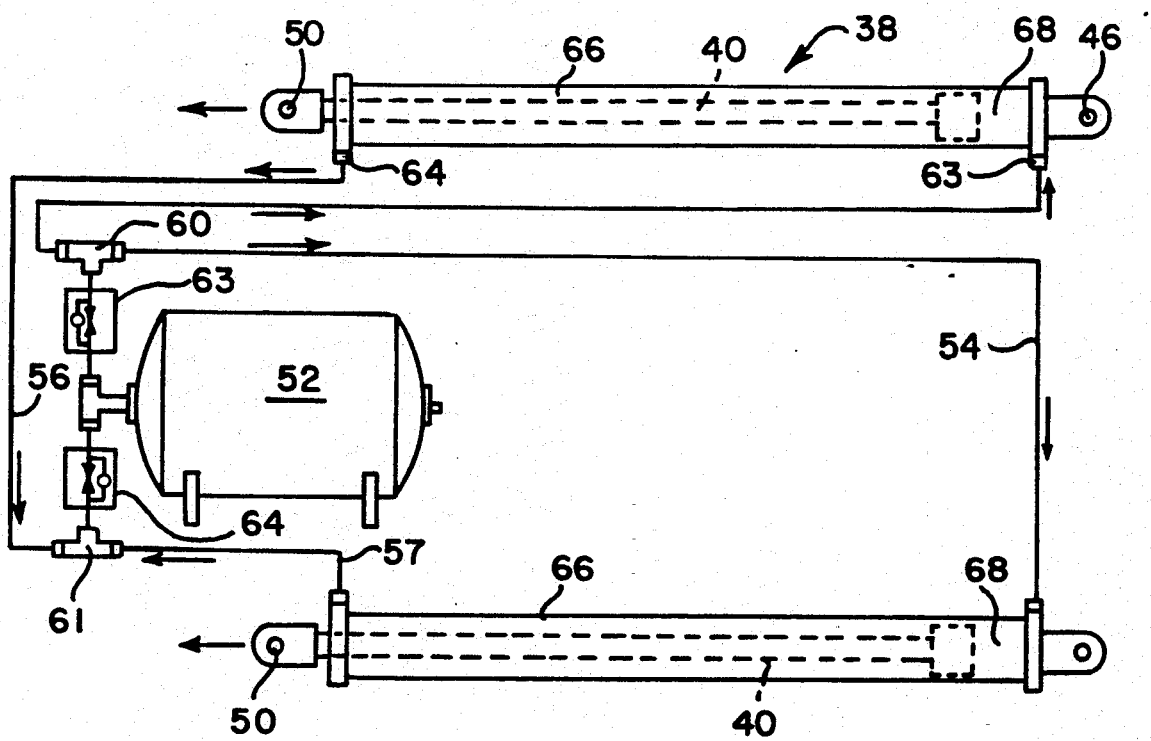
FIG. 5b is a schematic of the hydraulic cylinder and hydraulic circuit controlling the rate of rotation of the head frame as it moves from the dumping position to the dump position as the body lowers.
Figure 5A:
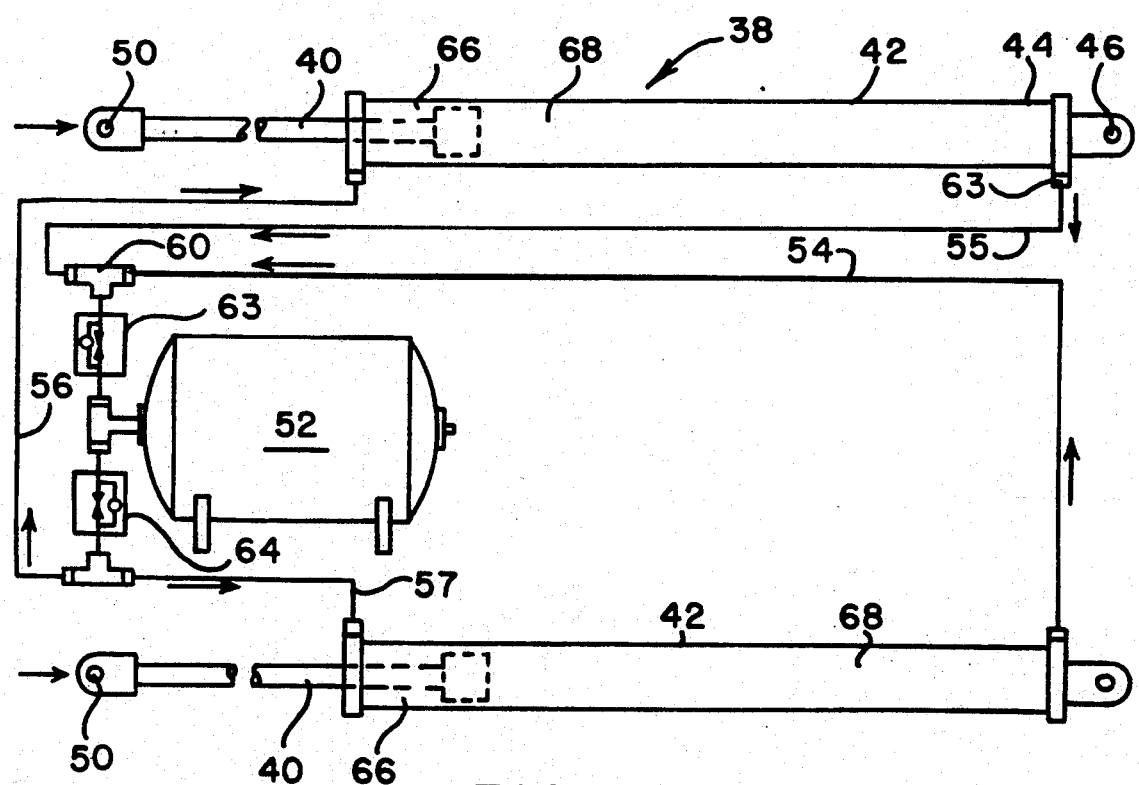
FIG. 5a is a schematic of the hydraulic cylinder and hydraulic circuit controlling the rate of rotation of the head frame as it moves from the loading position to the dump position as the body dumps.

The operation of the hydraulic cylinders 38 may be understood upon reference to FIGS. 5a and 5b which are schematic representations of the hydraulic cylinders 38 moving to the dumping position and the loading position, respectively. There is shown a pressure tank 52 containing a source of hydraulic fluid. In order to distribute the hydraulic fluid throughout the rotational controlling means, the pressure tank 52 is under air pressure, typically 5-10 psi. The pressure tank 52 delivers hydraulic fluid to the internal chambers 66, 68 through a plurality of regulator valves 63, 64, tees 60-61 and hoses 54-57. In order to prevent a vacuum from forming in the internal chambers 66, 68, the regulator valves 63, 64 permit restricted flow into the pressure tank 52 and unrestricted flow out of the pressure tank 52.

In the illustrated schematic representation, the piston rod 40 forms internal chambers 66, 68 which communicate with pressure tank 52 for receiving hydraulic fluid. As the piston rod 40 slides within the piston chamber 42 between the loading position and the dumping position, it will be appreciated that the internal chambers 66, 68 will vary in size. The pressure tank 52 will ensure that both chambers 66 and 68 are filled with hydraulic fluid despite the position of the piston rod 40, and concomitantly, the rotating head frame 24.

The hydraulic cylinders 38 are shown in the loading position in FIG. 5a. As the dump body 13 is raised, the head frame 24 will rotate to the dumping position causing the piston rod 40 to contract to the dumping position shown in FIG. 5b. The hydraulic fluid in chambers 68 exits through hoses 54, 55 and tee 60, and valve 63, back to the pressure tank 52 as shown by the arrows. Similarly, the pressure tank 52 forces hydraulic fluid to pass through valve 64, tee 61, and hoses 56, 57 and enter chambers 66. It will be appreciated that the presence of hydraulic fluid in chambers 68 controls the rate of contraction of the piston rod 40 as it moves from the loading position to the dumping position and concomitantly, the piston rod will control the rate of rotation of the head frame 24 in accordance with one of the objects of the present invention. Thus, the head frame 24 will not damage the dump body 13 as it is rotates to the dumping position.

As the lifting means allows the dump body 13 to lower from the dumping position back to the loading position as shown in FIG. 5b, gravity acts to rotate the head frame 24 back to the head end 15 of the dump body 13 and, concomitantly, extends the piston rod 40. The force of the piston rod 40 will cause the hydraulic fluid to exit internal chamber 66 through hoses 56, 57 and tee 61, through valve 64 and enter the pressure tank 52. Hydraulic fluid will leave the pressure tank 52 through valve 63, tee 60 and hoses 54, 55 to enter chamber 68. The presence of hydraulic fluid in chamber 66 regulates the rate of extension of the piston rod which, in turn, controls the rate of rotation of the head frame 24 as it returns to the loading position.

It will now be appreciated that the presence of hydraulic fluid in chambers 66, 68 acts to control the rate of rotation of the head frame 24 in both directions along the arcuate path and prevent gravity from uncontrollably accelerating the head frame 24, which could otherwise damage the dump body 13 and head frame 24.

In order to dislodge the load which may be trapped in the bottom 16 of the dump body 13 during the dumping operation, a means for ejecting the load is provided. In the preferred embodiment, the ejecting means includes a load ejector assembly 70 pivotally attached to the transverse bar 28 of the head frame 24 by a plurality of chains 76. The bottom portion 74 of the load ejector 70 generally rests on the bottom floor 16 of the dump body 13 in the loading position so that substantially all of the load will rest upon the load ejector 70 when the dump body is loaded.

As may be seen in FIG. 2, when the head frame 24 is rotated to the dumping position, the load ejector 70 pulls on and moves head frame 24 so that the load ejector 70 is moved from the floor 16 of the dump body 13 and hangs substantially vertically near the dump end 78 of the dump body 13, thus dislodging substantially all of the load.

Figure 3:
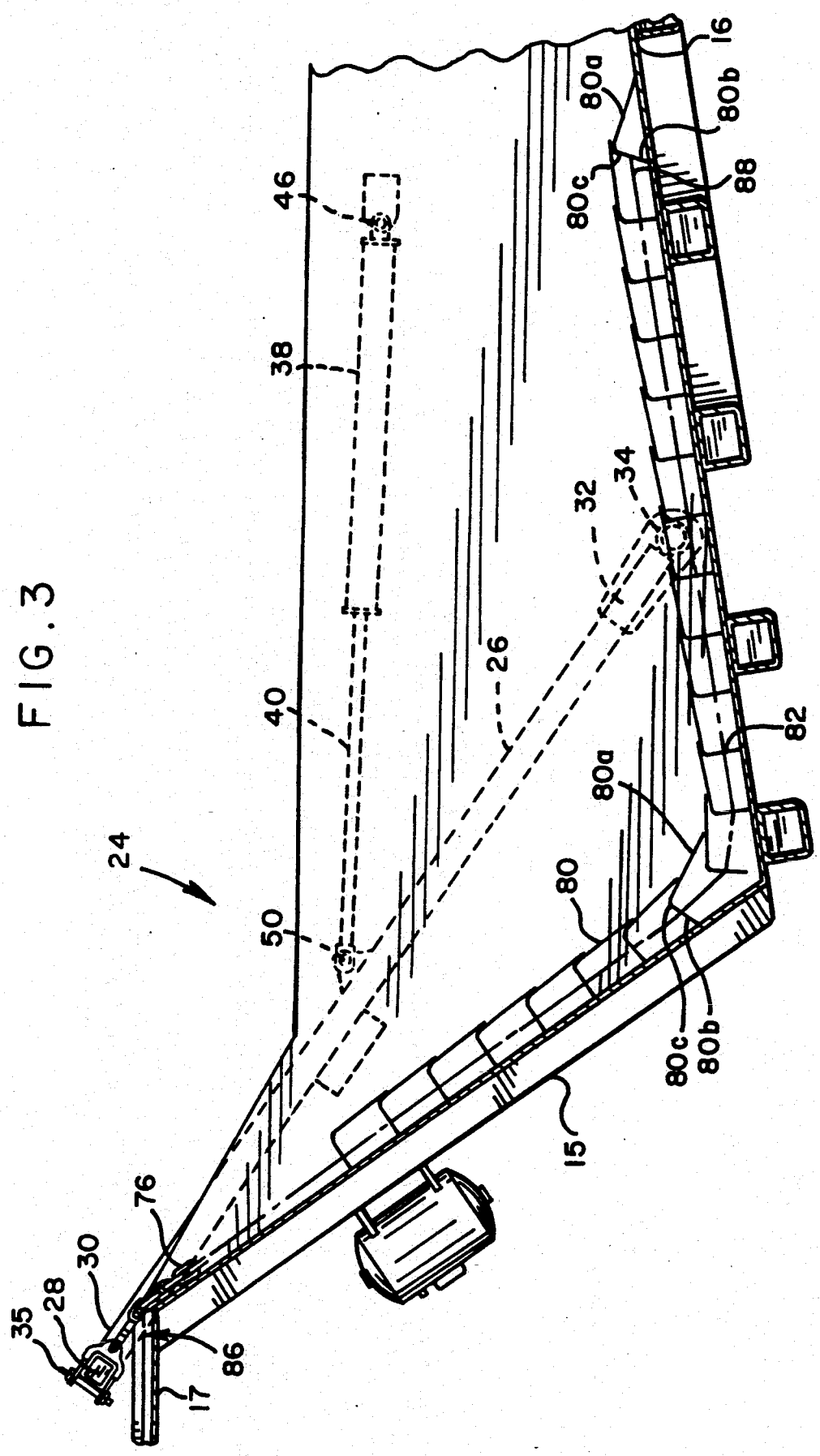
FIG. 3 is an enlarged cross-sectional view of rotating head frame and load ejector assembly shown in FIG. 1.
Figure 4:
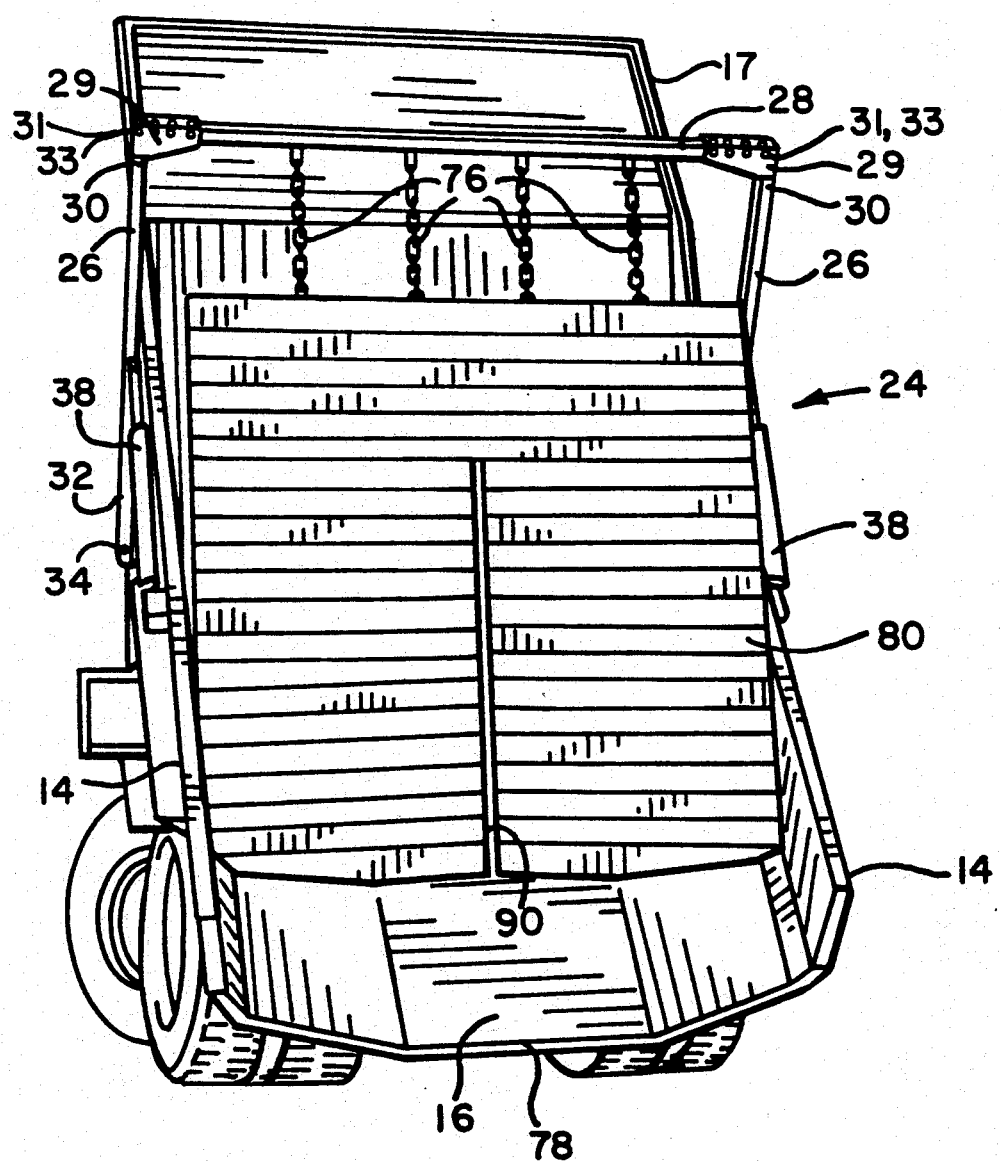
FIG. 4 is a perspective view showing the rotating head frame and load ejector assembly in an intermediate position between the loading position and the dumping position.

Upon reference to the cross-sectional view of the load ejector in FIG. 3, it may be seen that the load ejector 70 includes a plurality of L-shaped lattice members 80 having sides 80a and 80b which form a corner 80c. The lattice members 80 have a plurality of aligned slots 82 in sides 80b to accept at least one chain 76. The chain 76 has a top end 86 attached to the transverse bar 28 and runs the length of the load ejector 70 where the bottom end 88 of the chain 76 is attached to the last lattice member 80. The lattice members 80 are individually mounted for movement on the chain 76 in order to permit the lattice members 80 to conform to the contours of the interior surface of the dump body 13 as the load ejector 13 moves in response to the rotating head frame 24. In the event that the dump body 13 has arcuate or U-shaped floors, slot 90, as shown in FIG. 4, further permits the lattice members 80 to conform to the contours of the floor 16. It will be appreciated that when load ejector 70 is assembled, the corners 80c are arranged so that they are substantially oriented towards the transverse bar 28 and one side forms a substantially continuous platform to accept the load. Similarly, the side 80a of the last lattice member 80 engages the floor 16 of the dump body 13 so that it scrapes the load as the head frame 24 rotates from the loading position to the dumping position.

I claim as my invention:

1. An apparatus for cleaning a dump truck body pivotally mounted on a truck frame, the dump body having a bottom floor, a head wall and two side walls for carrying a load and being rotatable between loading and dumping positions, the cleaning apparatus comprising:

a head frame pivotally mounted to the dump body for rotating along an arcuate path between the loading and dumping positions, the head frame comprising two opposing and parallel side arms having bottom and top ends, each arm pivotally mounted at the bottom end to the side wall at a respective pivot point, wherein the pivot points have a coaxial axis and a vertical plane passing through the axis, and a transverse bar connecting the side arms at the top ends; and means connected to the transverse bar for ejecting the load when the head frame rotates between the loading and dumping positions; where the center of gravity of the head frame and ejecting means is such that he center of gravity passes through the vertical plane in response to the rotation of the dump body between the loading and dumping positions causing the head frame to rotate; and a pair of passive double-acting hydraulic cylinders for controlling the rate o rotation of the head frame as the head frame moves from the loading to the dumping position and from the dumping to the loading position, each hydraulic cylinder mounted between the dump body and the respective side arm so that the prime mover of the head frame is the rotation of the dump body between the loading and dumping positions.

2. An apparatus according to claim 1 wherein the passive hydraulic cylinder comprises a piston rod pivotally and slidably disposed within a piston chamber so that the piston rod forms two internal chambers as it slides within the piston chamber in response to the side arm rotating along the arcuate path, the internal chambers are in communication with a source of hydraulic fluid so that the fluid fills the internal chambers and controls the rate of movement of the piston rod and, concomitantly, the rate of rotation of the head frame.

3. An apparatus according to claim 1 wherein the ejecting means comprises a load ejector having a top end pivotally attached to the transverse bar and a bottom portion which lies on the floor of the dump body so that the rearward rotation of the dump body causes the center of gravity of the head frame and the load ejector to rotate rearward of the vertical plane causing the head frame to extend the load ejector to dislodge the load.

4. An apparatus according to claim 3 wherein the load ejector comprises a plurality of L-shaped lattice members having first and second sides forming a corner, the first sides having a plurality of slots to receive a plurality of chains to individually mount the lattice members for movement, the chains have a top end pivotally attached to the transverse bar and a bottom end attached to the last lattice member so that the transverse bar moves the chain and the load ejector thereby dislodging the load when the head frame rotates to the dumping position.

5. An apparatus according to claim 1 wherein the rotating means comprises the head frame and the ejecting means having the center of gravity in front of the vertical plane in the loading position and to the rear of the vertical plane in the dumping position so that the head frame rotates to the front of the dump body in the loading position and rotates to the rear of the dump body in the dumping position.

6. An apparatus for cleaning a dump truck body pivotally mounted on a truck frame, the dump body having a bottom floor, a head wall and two side walls for carrying load and being rotatable between loading and dumping positions, the cleaning apparatus comprising:

a head frame pivotally mounted to the dump body for rotating along an arcuate path between the loading and dumping positions, the head frame comprising two opposing and parallel side arms having bottom and top ends, each arm pivotally mounted at the bottom end to the side wall at a respective pivot point wherein the pivot points have a coaxial axis and a vertical plane passing through the axis, and a transverse bar connecting the side arms at the top ends;

a load ejector having a top end pivotally attached to the transverse bar and a bottom portion which lies on the floor of the dump body for ejecting the load when the head frame is rotated to the dumping position;

the head frame and the load ejector having the center of gravity in front of the vertical plane in the loading position and to the rear of the vertical plane in the dumping position so that the rotation of the dump body toward the dumping position causes the center of gravity to rotate rearwardly through the vertical plane until the center of gravity passes through the vertical plane, causing the head frame to extend the load ejector to dislodge the load; and a pair of passive double-acting hydraulic cylinders for controlling the rate of rotation of the head frame as the head frame moves from the loading to the dumping position and from the dumping to the loading position, each hydraulic cylinder mounted between the dump body and the respective side arm so that the prime mover of the head frame is the rotation of the dump body between the loading and dumping positions.

7. An apparatus according to claim 6 wherein the passive hydraulic cylinder comprises a piston rod pivotally and slidably disposed within a piston chamber so that the piston rod forms two internal chambers as it slides within the piston chamber in response to the side arm rotating along the arcuate path, the internal chambers are in communication with a source of hydraulic fluid so that the fluid fills the internal chambers and controls the rate of movement of the piston rod and, concomitantly, the rate of rotation of the head frame.

8. An apparatus according to claim 6 wherein the load ejector comprises a plurality of L-shaped lattice member having first and second sides forming a corner, the first sides having a plurality of slots to receive a plurality of chains to individually mount the lattice members for movement, the chains have a top end pivotally attached to the transverse bar and a bottom end attached to the last lattice member so that the transverse bar moves the chain and the load ejector thereby dislodging the load when the head frame rotates to the dumping position.

9. An apparatus according to claim 6 wherein the side arms have opposing and parallel plate members rigidly attached to the top ends to receive a transverse bar between them, the plate members having a plurality of holes along an outside edge to receive a plurality of bolts so that when the plate members receive the transverse bar between them, the bolts will secure transverse bars having different lengths.

* * * * *